(12) United States Patent
Stenroos et al.

(10) Patent No.: US 7,723,947 B2
(45) Date of Patent: May 25, 2010

(54) ELECTRONIC DEVICE CHARGER

(75) Inventors: Pekka Stenroos, Kerava (FI); Matti Naskali, Tokyo (JP)

(73) Assignee: Nokia Corporation, Espoo (FI)

( * ) Notice: Subject to any disclaimer, the term of this patent is extended or adjusted under 35 U.S.C. 154(b) by 542 days.

(21) Appl. No.: 11/704,029

(22) Filed: Feb. 7, 2007

(65) Prior Publication Data
US 2008/0185989 A1 Aug. 7, 2008

(51) Int. Cl.
*H01M 10/44* (2006.01)
*H01M 12/00* (2006.01)
*H01M 8/00* (2006.01)
*H01M 2/02* (2006.01)

(52) U.S. Cl. .............................. 320/101; 429/9; 429/12; 429/34

(58) Field of Classification Search .................. 320/101, 320/103, 105, 106, 107, 108, 109, 110, 111, 320/112, 114, 137, 165; 429/9, 11, 32, 34
See application file for complete search history.

(56) References Cited

U.S. PATENT DOCUMENTS

| 6,322,920 | B1 | 11/2001 | Tomson | 429/34 |
| 7,440,780 | B2 * | 10/2008 | Mickle et al. | 455/573 |
| 7,511,452 | B2 * | 3/2009 | Bersenev | 320/106 |
| 2006/0108970 | A1 | 5/2006 | Leasure et al. | 320/101 |
| 2006/0147783 | A1 | 7/2006 | Cho et al. | 429/34 |
| 2007/0024238 | A1 | 2/2007 | Nakade et al. | 320/108 |

FOREIGN PATENT DOCUMENTS

| JP | 2004-194434 A | 7/2004 |
| JP | 2006-320047 A | 11/2006 |
| KR | 2003 0091409 | 3/2003 |
| KR | 2004 0029906 | 4/2004 |
| WO | WO 00-35032 | 6/2000 |

OTHER PUBLICATIONS

Jansen, A. et al., "Design of a Fuel Cell Powered Radio, a feasibility Study into Alternative Power Sources for Portable Products", Electronics and the Environment, 2000. ISEE 2000. Proceedings of the 2000 IEEE International Symposium on May 8-10, 2000, Piscataway, NJ; pp. 155-160; XP010504468.

* cited by examiner

*Primary Examiner*—Edward Tso
*Assistant Examiner*—M'Baye Diao
(74) *Attorney, Agent, or Firm*—Harrington & Smith

(57) ABSTRACT

An energy storing exterior cover for a user electronic device including an integrated energy store and an energy transfer interface for transferring energy electrically to a user electronic device when covered by the cover.

29 Claims, 3 Drawing Sheets

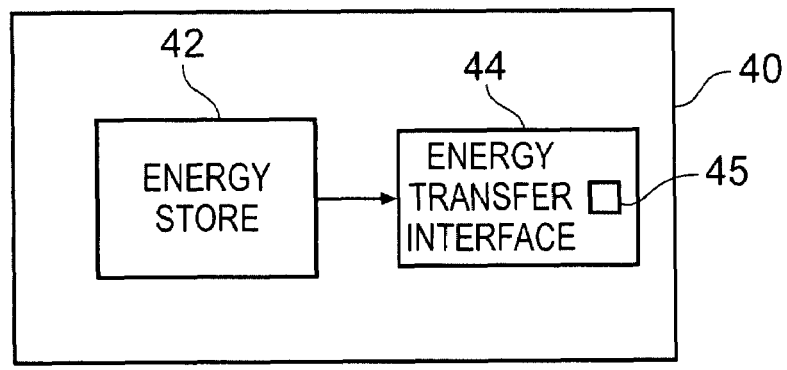
Fig. 3
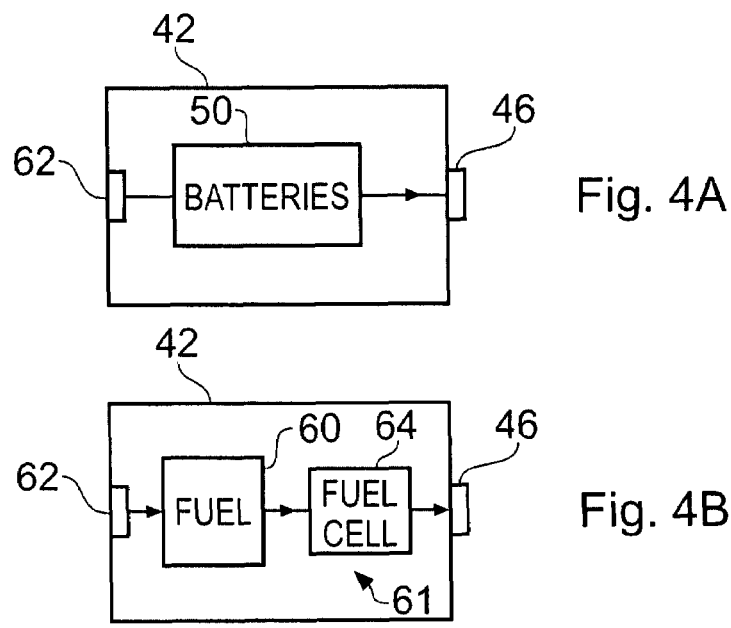
Fig. 4A
Fig. 4B
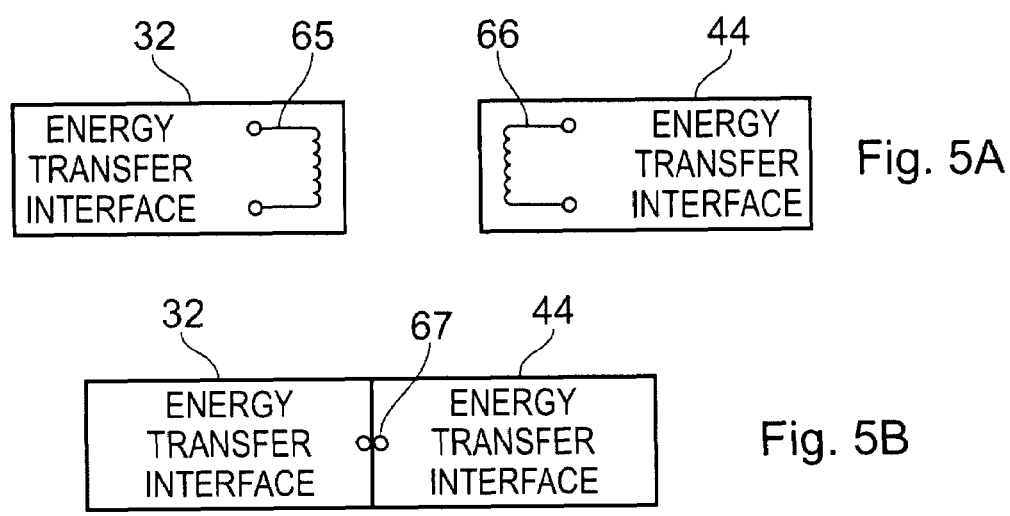
Fig. 5A
Fig. 5B

ELECTRONIC DEVICE CHARGER

FIELD OF THE INVENTION

Embodiments of the present invention relate to an electronic device charger.

BACKGROUND TO THE INVENTION

There is a trend for electronic devices to increase the number or type of functions they perform and therefore increase their energy consumption. There is also a trend to decrease the size of electronic devices.

As the amount of energy stored at an electronic device is limited by its size it can be difficult to balance the need for energy consumption with the need for a small compact device.

One approach to this problem has been to make electronic devices more energy efficient.

Another approach to this problem has been to develop more efficient energy stores. This has involved the development of batteries, such as Li-ion batteries, that store greater energy per unit volume and then the replacement of Li-ion batteries by fuel cells.

It would be desirable to increase the energy available for use at an electronic device.

BRIEF DESCRIPTION OF THE INVENTION

According to one embodiment of the invention there is provided a portable charger, comprising: a cover for a portable electronic device; an energy store for storing energy; and an energy transfer interface for transferring stored energy from the energy store to the portable electronic device.

According to another embodiment of the invention there is provided a system comprising: a portable electronic device comprising a device energy store; and a portable charger comprising: a cover for the portable electronic device; a charger energy store for storing energy; and an energy transfer interface for transferring stored energy from the charger energy store to the device energy store.

According to another embodiment of the invention there is provided a portable electronic device comprising an interface for initiating energy transfer to the portable electronic device when the portable electronic device is combined with the portable charger.

According to another embodiment there is provided a method comprising: charging a device energy store within a portable electronic device by covering the portable electronic device with an energy storing exterior cover that transfers stored energy to the device energy store.

According to another embodiment of the invention there is provided an energy storing exterior cover for a user electronic device comprising an integrated energy store and an energy transfer interface for transferring energy electrically to a user electronic device when covered by the cover.

According to another embodiment of the invention there is provided a portable charger, comprising: an energy store for storing energy as liquid fuel; and an energy transfer interface for transferring energy from the energy store to the portable electronic device.

In some embodiments of the invention, charging of the portable electronic device occurs when it is not is use via the portable charger. As the energy store is part of the portable charger and not the portable electronic device, the extra size and weight associated with the energy store is part of the portable charger and not part of the portable electronic device.

BRIEF DESCRIPTION OF THE DRAWINGS

For a better understanding of the present invention reference will now be made by way of example only to the accompanying drawings in which:

FIG. 3 schematically illustrates functional components of an energy storing exterior cover;

FIG. 4A illustrates a battery embodiment for the cover energy store;

FIG. 4B illustrates a fuel system embodiment for the cover energy store;

FIG. 5A illustrates charging by inductive coupling;

FIG. 5B illustrates charging via a galvanic connection;

DETAILED DESCRIPTION OF EMBODIMENTS OF THE INVENTION

Figures 1A, 1B:
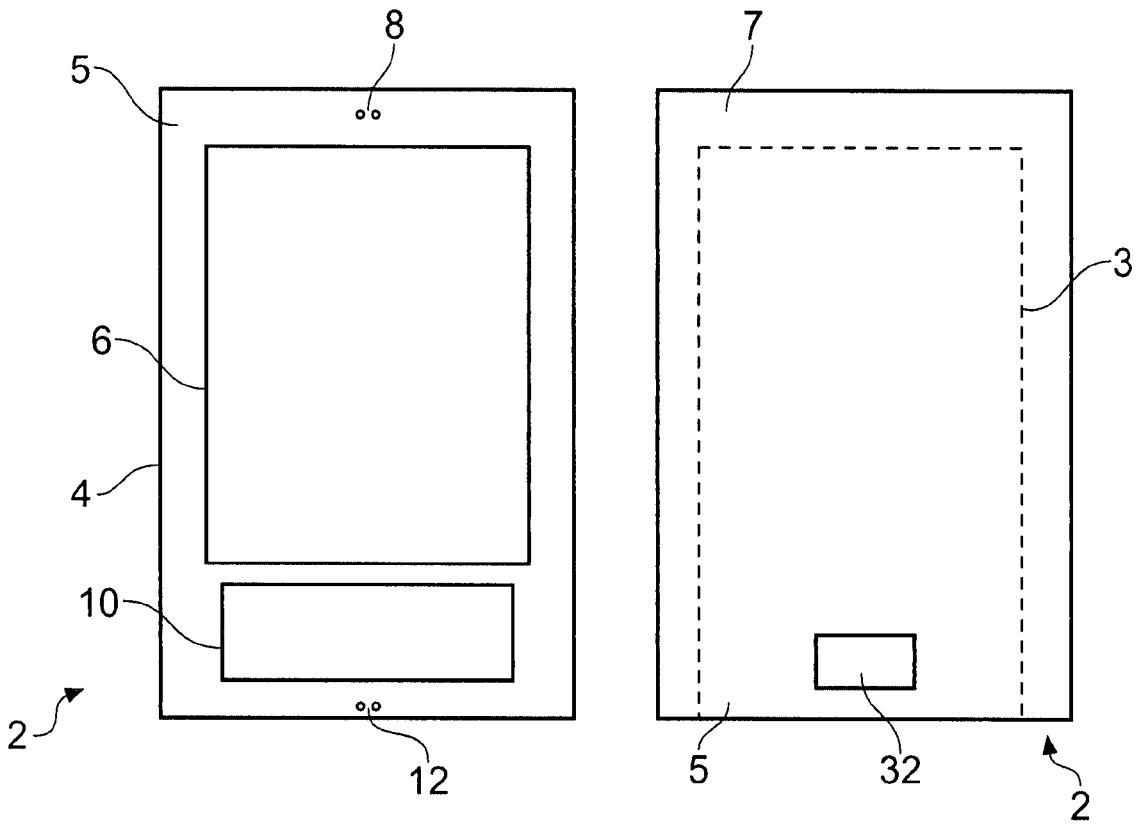
FIGS. 1A and 1B illustrate the exterior front face and exterior rear face of an electronic device.
Figure 2:
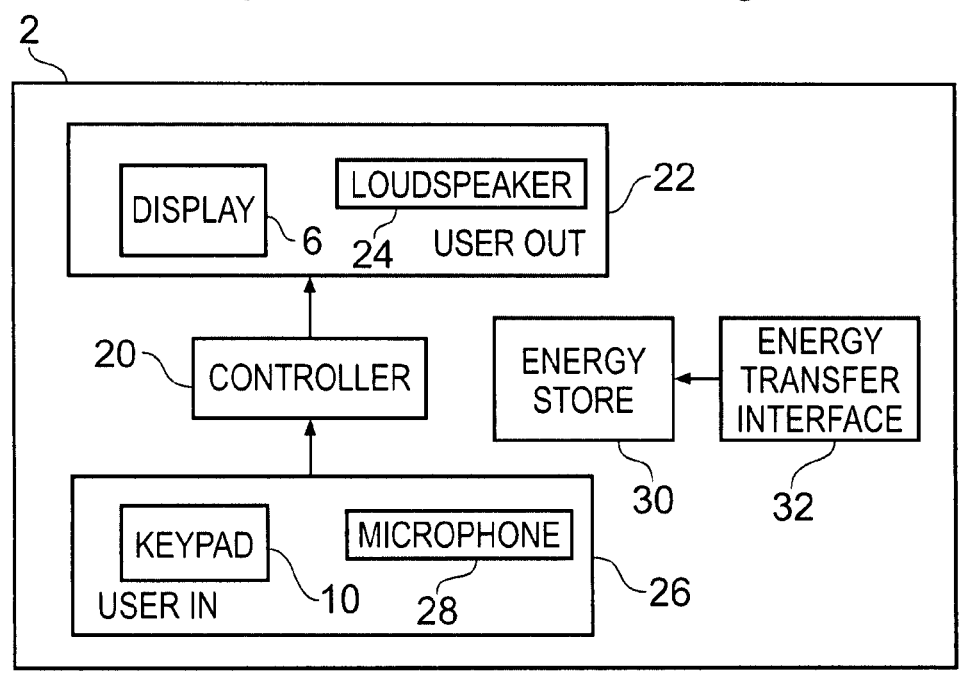
FIG. 2 illustrates some functional components of the electronic device.

FIGS. 1A, 1B and 2 schematically illustrate a portable electronic device 2. FIGS. 1A and 1B illustrate the exterior front face 5 and exterior rear face 7 of the electronic device 2 and FIG. 2 illustrates some functional components of the electronic device.

Referring to FIG. 2 the electronic device 2 comprises, as functional components in this example, a controller 20, user output components 22, user input components 26, a device energy store 30 and an energy transfer interface for re-charging the battery 30 by transferring energy from a source external of the device 2 to the battery 30.

The user output components 22 are connected to receive command signals from the controller 20. In this example the user output components include a display 6 and a loudspeaker 24. In other implementations different user output components 22 may be used such as a jack or Bluetooth transceiver for earphones, indicators etc The user input components 26 are connected to provide command signals to the controller 20. In this example the user input components include a keypad 10 and a microphone 28. In other implementations different user input components 26 may be used such as joysticks, touch screens etc The device energy store 30 is typically a battery or batteries, but it may also be a fuel cell system comprising a reservoir for fuel and a fuel cell.

Referring to FIG. 1A, the electronic device 2 has an exterior rigid housing 4 that has a front face 5 and a rear face 7. The front face 5 typically carries the components that a user most frequently uses. These include the user output components 22 such as, for example, the display 6 and a loudspeaker port 8 for the loudspeaker 24 and the user input components 26 such as, for example, a keypad 10 and microphone ports 12 for microphone 28.

Referring to FIG. 2A, the rear face 7, in this example, has a removable portion 3 which covers a cavity that receives the device energy store 30 used by the electronic device 2. The removable portion may be user removable. In this example, the rear face 7 also presents the energy transfer interface 32 which is used to transfer energy to the device energy store 30 positioned behind the removable portion 3.

It will of course be appreciated that different electronic devices will have different user input component 26 and/or different user output components 22. Furthermore, the positioning of these components and of the energy transfer interface 32 may be modified.

The device energy store 30 is integrated within the device 2 in the sense that it is incorporated within the housing 5 of the device 2. The device energy store 30 may, or may not, be user removable. The energy transfer interface 32 receives energy from an energy storing exterior cover 40 for the electronic device. The cover 40 is used to replenish the device energy store 30 while it is integrated in the electronic device 2. If the device energy store 30 is a battery (or batteries) the energy is typically received via a galvanic dc connection or via a wireless connection electromagnetically. If the device energy store 30 is a fuel cell system the energy is typically received as fuel.

The electronic device 2 is typically sized so that it can be placed within a user's pocket. It may be hand-portable in the sense that it is sized so that it be carried placed in a palm of the user's hand.

The portable electronic device 2 may be a portable cellular telephone and/or a portable digital camera and/or a portable personal music player and/or a personal digital assistant and/or a portable multimedia device.

The term 'user electronic device' is used herein to refer to an electronic device with which a user interacts using at least one input component and at least one output component.

Figure 6A:
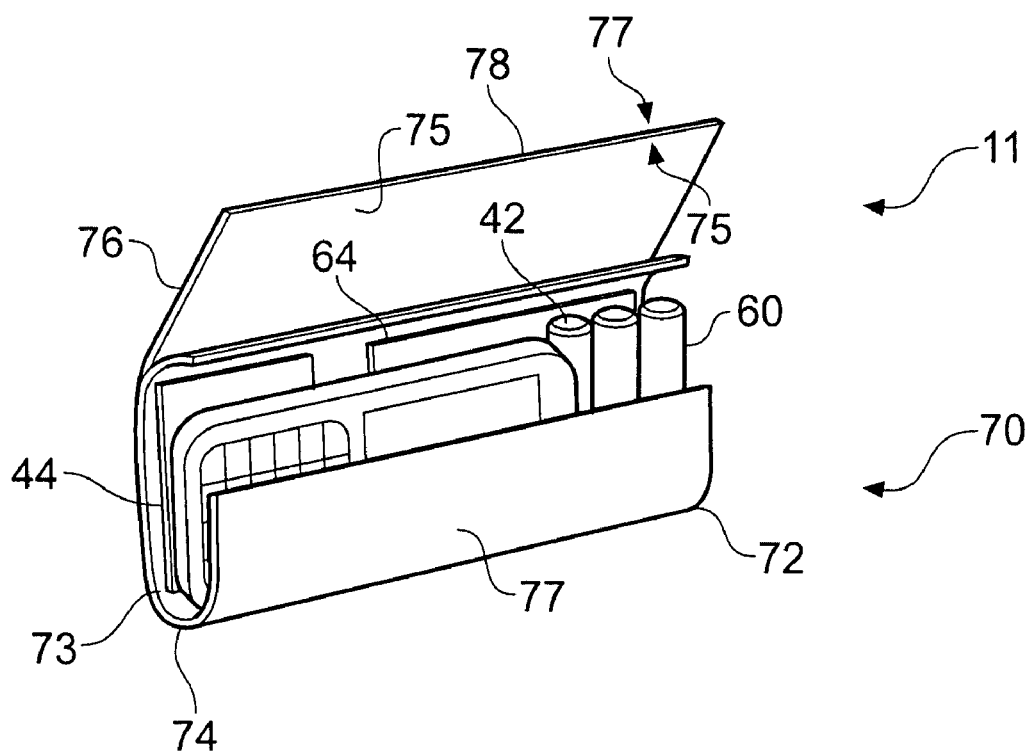
FIG. 6A illustrates an energy storing exterior cover formed as a flexible wrap
Figure 6B:
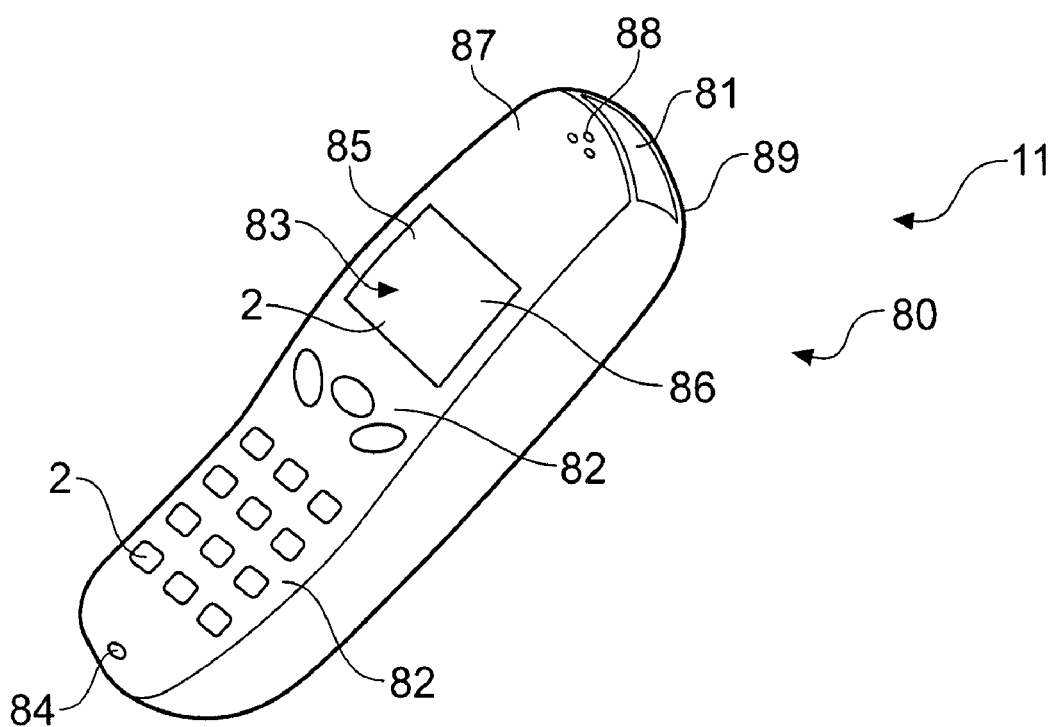
FIG. 6B illustrates, an energy storing exterior cover formed as a flexible pouch.

FIG. 3 schematically illustrates functional components of an energy storing exterior cover 40 for the electronic device 2. FIGS. 6A and 6B schematically illustrate some example embodiments including a wrap 70 embodiment and a pouch 80 embodiment.

Referring to FIG. 3, an energy storing exterior cover 40 comprises, as functional components, an energy store 42 and an energy transfer interface 44. The cover 40 performs an energy storing function represented by the energy store 42 and an energy transfer function represented by the energy transfer interface 44. The cover 40 may also provide a protective function shielding the electronic device 2 from knocks and/or scratches.

Energy transfer interface 44 is operable to transfer energy from the energy store 42 to the electronic device's energy transfer interface 32 until the battery (or batteries) 30 are completely recharged or the energy store 42 is completely depleted. The capacity of the energy store 42 is typically such that it can completely recharge the device's energy store 30 a plurality of times. The energy transfer may occur while the combination of device 2 and cover 40 are in transit.

The energy transfer interface 44 may be arranged to initiate the transfer of energy from the energy store 42 to the electronic device's energy transfer interface 32 automatically, without user action. This may be achieved by incorporating a detector 45 in the energy transfer interface 44 that detects the presence of an energy transfer interface 32 of an electronic device. One form of detector is a detector that detects a change in electrical characteristics that occurs as a result of the presence of the electronic device 2.

The energy transfer interface 44 or the energy store 42 may comprise an indicator for indicating when the energy stored by the energy store drops beneath a threshold. This warns the user that the energy store needs to be replenished. The indicator may provide a visual or audio alert. Alternatively, the indicator may provide an electronic signal to the device 2 for the device to create the alert.

The dimensions of the cover 40 can be such that the system formed by the combination of cover 40 and electronic device 2 can be placed within a user's pocket. The system may be hand-portable in the sense that it is sized so that it can, as an example, be carried placed in a palm of the user's hand.

When the cover 40 and electronic device 2 are combined they form a system 11 in which the cover 40 surrounds or envelops the electronic device 2 as illustrated in FIGS. 6A and 6B. In FIG. 6A a flexible wrap 70 partially surrounds the electronic device. In FIG. 6B, the flexible pouch 80 almost entirely surrounds an electronic device 2. In other embodiments, the cover 40 may be, for example, a carrying case or may be a case attached to a belt or may be a hand bag strap or may be integrated into a handbag.

The electronic device 2 is usable when not in combination with the cover 40. The electronic device 2 may or may not be usable when in combination with the cover 40.

The cover 40 is typically arranged so that it can, after combination with the electronic device 2, be easily separated from the electronic device 2. This is beneficial as it may enable easier use of the electronic device 2. It may also allow a cover 40 to be detached to replenish its energy store 42.

The cover 40 may be replaceable in that it can be removed from combination with the electronic device 2, its energy store 42 replenished and then it can be re-combined with the electronic device 2.

The cover 40 may be interchangeable in that it can be removed from combination with the electronic device 2 and a similar energy storing exterior cover can be combined with the electronic device 2.

The cover 40 may be exchangeable in that it can be removed from combination with the electronic device 2 and a different energy storing exterior cover can be combined with the electronic device 2.

FIG. 4A illustrates one embodiment for the cover energy store 42. In this embodiment the energy store 42 comprises an input interface 62 for replenishing the energy store, an output interface 46 for providing energy to the energy transfer interface 44 and one or more rechargeable batteries 50. The batteries are re-charged via the input interface 62 and provide electrical energy to the energy transfer interface 44 via the output interface 46.

FIG. 4B illustrates another embodiment for an energy store 42. In this embodiment the energy store 42 comprises an input interface 62 for replenishing the energy store, an output interface for providing energy to the energy transfer interface 44 and a fuel cell system 61. The fuel cell system 61 comprises a fuel reservoir 60 and a fuel cell unit 64 that comprises one or more fuel cells. The fuel reservoir 60 is replenished with fuel via the input interface 62 or by user replacement of the reservoir 60 or of one or more tanks forming the reservoir 60. This fuel is typically a fluid. It may, for example, be a pressurized hydrogen gas or methane or if may be a liquid alcohol such as methanol. The fuel cell unit 64 receives fuel from the fuel reservoir 60 and as a by-product of converting the fuel to water provides electrical energy to the energy transfer interface 44.

If the energy transfer interface 44 transfers energy by a galvanic connection 67, as illustrated in FIG. 5B, then the energy transfer interface 44 need only be a galvanic contact which connects with a corresponding galvanic contact 32 of the electronic device 2.

If the energy transfer interface 44 transfers energy by inductive coupling, as illustrated in FIG. 5A, then the energy transfer interface 44 requires an inductor 65 and circuitry for driving the inductor 65 which couples with a corresponding inductor 66 of the electronic device's energy transfer interface 44.

FIG. 6A illustrates an energy storing exterior cover 40 formed as a flexible wrap 70. The wrap 70 partially surrounds the electronic device 2 forming a cavity 73 in which the electronic device snugly nestles. The flexible wrap 70 forms a wallet like structure with a flap 78 that is rotatable downwards about the flexible portion 76 to form an enclosure with the upwardly bent portion 74.

In the illustrated embodiment, the flexible wrap 70 comprises an integrated fuel cell system. In this example, canisters of pressurized hydrogen provide the fuel reservoir 60. However in other embodiments, the fuel reservoir may be a flexible bag positioned between an interior membrane 75 and an exterior membrane 77 of the flexible wrap 70.

An additional security membrane may be placed between the exterior membrane 77 and the fuel reservoir 60 to protect the fuel reservoir 60 from penetration from sharp implements. For example, the security membrane may be made from woven Kevlar. Alternatively, the fuel reservoir 60 may have the security membrane incorporated into its boundary.

In the illustrated embodiment, the flexible wrap comprises an energy transfer interface 32 which is used to inductively charge the electronic device 2.

The combination of the flexible wrap 70 and contactless charging of the device 2 by the flexible wrap 70 result in the device 2 being easily separated from the flexible wrap 70 for use.

FIG. 6B illustrates, a combination of an electronic device 2 and an energy storing exterior cover 40 formed as a flexible pouch or bootie 80. The pouch 80 almost entirely surrounds the electronic device 2 forming a cavity 83 in which the electronic device snugly nestles. The pouch 80 forms an enclosure with an opening 81 for receiving and removing the electronic device 2.

In the illustrated embodiment, the pouch 80 comprises an integrated fuel cell system 61. In this example, the fuel reservoir 60 is a flexible bag positioned between an interior membrane 85 and an exterior membrane 87 of the flexible wrap 80.

An additional security membrane 89 may be placed between the exterior membrane 87 and the fuel reservoir 60 to protect the fuel reservoir from penetration of sharp implements. For example, the security membrane 89 may be made from woven Kevlar. Alternatively, the fuel reservoir 60 may have the security membrane incorporated into its boundary.

In this example, the electronic device may be used, at least partially, while it is received within the flexible pouch 80. The flexible pouch 80 has apertures 82, 84, 86 and 88 for alignment in register with, respectively, the keypad 10, the microphone ports 12, the display 6 and the loudspeaker ports 8. Flexible plastic membranes may form windows covering the apertures 82 and 86.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A portable charger, comprising:
   a cover for a portable electronic device;
   a replenishable energy store configured to store energy;
   an energy transfer interface configured to transfer stored energy from the replenishable energy store to the portable electronic device; and
   a detector configured to automatically start a transfer of the stored energy from the replenishable energy store of the portable charger to the portable electronic device.

2. A portable charger as claimed in claim 1, wherein the energy store comprises a fuel reservoir.

3. A portable charger as claimed in claim 1, wherein the energy store comprises a fuel reservoir and a fuel cell.

4. A portable charger as claimed in claim 1, wherein fuel reservoir is integrated into the cover.

5. A portable charger as claimed in claim 4, wherein the cover comprises a security membrane for protecting the fuel reservoir.

6. A portable charger as claimed in claim 1, wherein the energy store comprises a battery.

7. A portable charger as claimed in claim 6, wherein the energy transfer interface transfers energy via a galvanic connection.

8. A portable charger as claimed in claim 6, where the energy transfer interface transfers energy inductively.

9. A portable charger as claimed in claim 1, wherein the energy transfer interface transfers energy without physically contacting the portable electronic device.

10. A portable charger as claimed in claim 1, wherein the cover is flexible.

11. A portable charger as claimed in claim 10, wherein the cover is a wrap.

12. A portable charger as claimed in claim 10, wherein the cover is a pouch.

13. A system comprising:
    a portable electronic device comprising a device energy store; and
    a portable charger comprising:
       a cover for the portable electronic device;
       a rechargeable charger energy store configured to store energy; and
       an energy transfer interface configured to transfer stored energy from the rechargeable charger energy store to the device energy store, wherein the portable charger is configured to automatically start the transfer of the stored energy from the rechargeable charger energy store to the portable electronic device.

14. A system as claimed in claim 13 wherein the device energy store is an integrated fuel reservoir.

15. A system as claimed in claim 13 wherein the portable device is mobile telephone.

16. A system as claimed in claim 13 wherein the cover is a carrying case for the mobile telephone.

17. A portable electronic device for use in the system of claim 13, comprising an interface for initiating energy transfer to the portable electronic device when the portable electronic device is combined with the portable charger.

18. A portable energy storing exterior cover for a user electronic device comprising an integrated energy store and an energy transfer interface configured to transfer energy electrically to a user electronic device when covered by the cover, wherein the portable energy storing exterior cover is configured to surround a majority of the electronic device, and wherein the cover is configured to allow access to a user input component of the device and a display of the device when covered by the cover.

19. An energy storing exterior cover as claimed in claim 18, wherein the energy store comprises a fuel reservoir.

20. An energy storing exterior cover as claimed in claim 18, wherein the energy store comprises a fuel reservoir and a fuel cell.

21. An energy storing exterior cover as claimed in claim 19, comprising a security membrane for protecting the fuel reservoir.

22. An energy storing exterior cover as claimed in claim 18, wherein the energy transfer interface transfers energy electromagnetically to the electronic device.

23. An energy storing exterior cover as claimed in claim 18, wherein the energy transfer interface transfers energy inductively.

24. An energy storing exterior cover as claimed in claim 18, further comprising a detector for automatically starting a transfer of stored energy to the electronic device.

25. A portable charger, comprising:
an energy store for storing energy as liquid fuel; and
an energy transfer interface configured to transfer energy from the energy store to the portable electronic device, wherein the energy is transferred by the energy transfer interface of the portable charger to the portable electronic device as liquid fuel.

26. A portable charger as claimed in claim 2, further comprising at least one fuel cell configured to convert liquid fuel to electricity, wherein the energy is transferred by the energy transfer interface as electricity.

27. A portable charger as claimed in claim 25, wherein the liquid fuel is pressurized substance that is gaseous at atmospheric pressure.

28. A portable charger as in claim 1 wherein the replenishable energy store is a rechargeable battery.

29. A system as in claim 13 wherein the rechargeable charger energy store is a rechargeable battery.

* * * * *